(12) United States Patent
Sugimura et al.

(10) Patent No.: US 8,111,316 B2
(45) Date of Patent: Feb. 7, 2012

(54) VIDEO CAMERA

(75) Inventors: Yukio Sugimura, Kanagawa-ken (JP); Shuichiro Maeda, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 360 days.

(21) Appl. No.: 12/415,995

(22) Filed: Mar. 31, 2009

(65) Prior Publication Data

US 2009/0244363 A1 Oct. 1, 2009

(30) Foreign Application Priority Data

Mar. 31, 2008 (JP) ................. 2008-093968

(51) Int. Cl.
 *H04N 5/222* (2006.01)
 *H04N 5/225* (2006.01)
 *G03B 13/02* (2006.01)
(52) U.S. Cl. .................. 348/333.06; 348/374; 348/376; 396/383
(58) Field of Classification Search ............. 348/333.01, 348/333.06, 333.07, 373–376; 396/383, 396/535
 See application file for complete search history.

(56) References Cited

U.S. PATENT DOCUMENTS

| 8,023,039 | B2 * | 9/2011 | Mito et al. | ..................... 348/373 |
| 2005/0134727 | A1 * | 6/2005 | Teramoto et al. | ............. 348/375 |
| 2008/0161998 | A1 * | 7/2008 | Yokoi | ............................. 701/36 |

FOREIGN PATENT DOCUMENTS

| JP | 04-331580 | 11/1992 |
| JP | 11-355620 | 12/1999 |
| JP | 2000-152048 | 5/2000 |
| JP | 2003037760 | 2/2003 |
| JP | 2005123470 | 5/2005 |
| JP | 2006085002 | 3/2006 |
| JP | 2007-174526 | 7/2007 |
| JP | 2007-180706 | 7/2007 |
| JP | 2007208614 | 8/2007 |
| JP | 2009033547 | 2/2009 |

OTHER PUBLICATIONS

Machine Translation of JP2009-033547 to Murakami published Feb. 12, 2009.* Machine Translation of JP2000-152048 to Noto published May 30, 2000.*
Office Action dated Mar. 23, 2010 from European patent application No. 09 002 473.8-1241, 4 pages.
European Search Report dated Apr. 29, 2009 in European patent application No. 09002473.8.

* cited by examiner

*Primary Examiner* — Daniel M Pasiewicz
(74) *Attorney, Agent, or Firm* — Venable LLP; Michael A. Sartori; Ryan M. Flandro

(57) ABSTRACT

In a video camera, air outlet holes and air inlet holes are disposed in a panel-facing surface of a camera body. A duct is disposed inside the camera body and guides the air taken in through the air inlet holes to the air outlet holes. A first heat sink is so arranged as to extend from an image sensor into the duct, and the first heat sink releases the heat generated by the image sensor into the duct. A liquid crystal panel unit is movably disposed between a first position in which a first face of the liquid crystal panel unit including a display screen of a liquid crystal panel faces the panel-facing surface of the camera body and a second position in which a second face faces the panel-facing surface. When the liquid crystal panel unit is in the first position, the first face is so formed as to cover the air outlet holes and the air inlet holes. The second surface of the liquid crystal panel unit is formed so that the air outlet holes and the air inlet holes are open to the exterior when the liquid crystal panel unit is in the second position.

14 Claims, 13 Drawing Sheets

VIDEO CAMERA

CROSS-REFERENCE TO RELATED APPLICATION

The present application claims the priority benefit of Japanese patent application number 2008-093968 filed Mar. 31, 2008. The disclosure of which is incorporated herein by reference.

BACKGROUND OF THE INVENTION

1. Field of the Invention

The present invention relates to a video camera and, more particularly, to a video camera having an image sensor.

2. Description of the Related Art

Video cameras are equipped with an image sensor such as a CCD (Charge-Coupled Device) image sensor or a CMOS (Complementary Metal Oxide Semiconductor) image sensor. The output images of an image sensor can be adversely affected when they get too hot. To solve this problem, it has been proposed that video cameras have an opening in the face of the camera body opposite a liquid crystal panel unit in its "closed" position. It has also been proposed to provide an image pickup apparatus with a duct around the image sensor, thermo module, and radiating fin so that air in the duct can be discharged outside a camera casing by the operation of a motor-driven fan.

In recent years, a number of video cameras have been developed in which a liquid crystal panel unit can be not only opened but can also be closed with the liquid crystal panel facing outside. With video cameras of this type and having an opening as described above, the opening can be 'stopped up' by the liquid crystal panel unit while images are being displayed on the liquid crystal panel. Generally, when an image is being displayed on the liquid crystal panel, the interior temperature of the video camera will rise. It thus becomes difficult to release the internal heat outside if the opening is stopped up as described above. In the alternative proposed solution whereby an air outlet is exposed on the outside of the image pickup apparatus, a further need is created with respect to improving the aesthetics of the camera.

There is, therefore, a need for a video camera that is not only capable of suppressing internal temperature but that also retains a pleasant appearance.

SUMMARY OF THE INVENTION

In order to resolve these problems, a video camera according to one embodiment of the present invention comprises: a camera body having air outlet holes and air inlet holes, the air outlet holes or the air inlet holes being disposed in a panel-facing surface thereof; a duct, disposed inside the camera body, which guides air taken in through the air inlet holes to the air outlet holes; an image sensor disposed inside the camera body; a heat sink which releases the heat generated by the image sensor into the duct; and a liquid crystal panel unit having a liquid crystal panel, the liquid crystal panel unit being disposed movably between a first position in which a first face thereof including a display screen faces a panel-facing surface of the camera body and a second position in which a second face, which is different from the first face, faces the panel-facing surface of the camera body. The liquid crystal panel unit is so formed that when the liquid crystal panel is in the second position, an airflow resistance through the air outlet holes or the air inlet holes provided in the panel-facing surface is lower than when the liquid crystal panel is in the first position.

BRIEF DESCRIPTION OF THE DRAWINGS

Embodiments will now be described by way of example with reference to the accompanying drawings, which are exemplary and not limiting. Like elements are numbered alike amongst the several figures.

DETAILED DESCRIPTION

The invention will now be described by reference to preferred embodiments. This description does not intend to limit the scope of the present invention, but to exemplify the invention.

Figure 1:
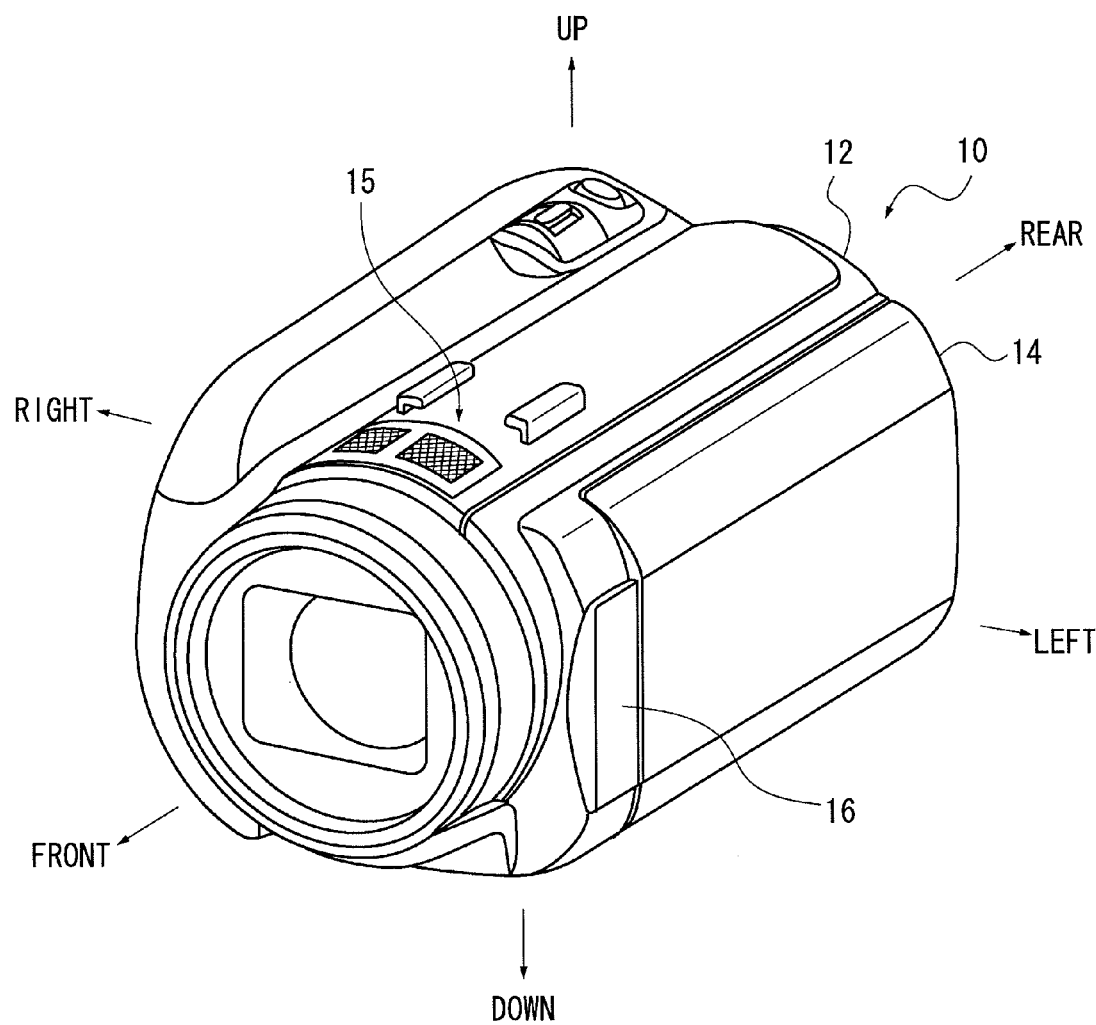
FIG. 1 is a perspective view showing an appearance of a video camera.

FIG. 1 is a perspective view showing an appearance of a video camera 10 according to an embodiment of the present invention. The video camera 10 includes a camera body 12 and a liquid crystal panel unit 14. A microphone 15 is provided on the upper surface of the camera body 12. The microphone 15 is secured to the casing of the camera body 12 through an intermediary gel. This can reduce transmission of the noise or vibration generated in the camera body 12 to the microphone 15.

The liquid crystal panel unit 14 is provided on the left side surface of the camera body 12. The liquid crystal panel unit 14 is turnably supported by the camera body 12 around a vertical turning shaft (not shown) vertically disposed within a turning mechanism 16. A user can open and close the liquid crystal panel unit 14 relative to the camera body 12 by moving the rear-end portion thereof leftward, thereby turning it around the vertical turning shaft.

Figure 2:
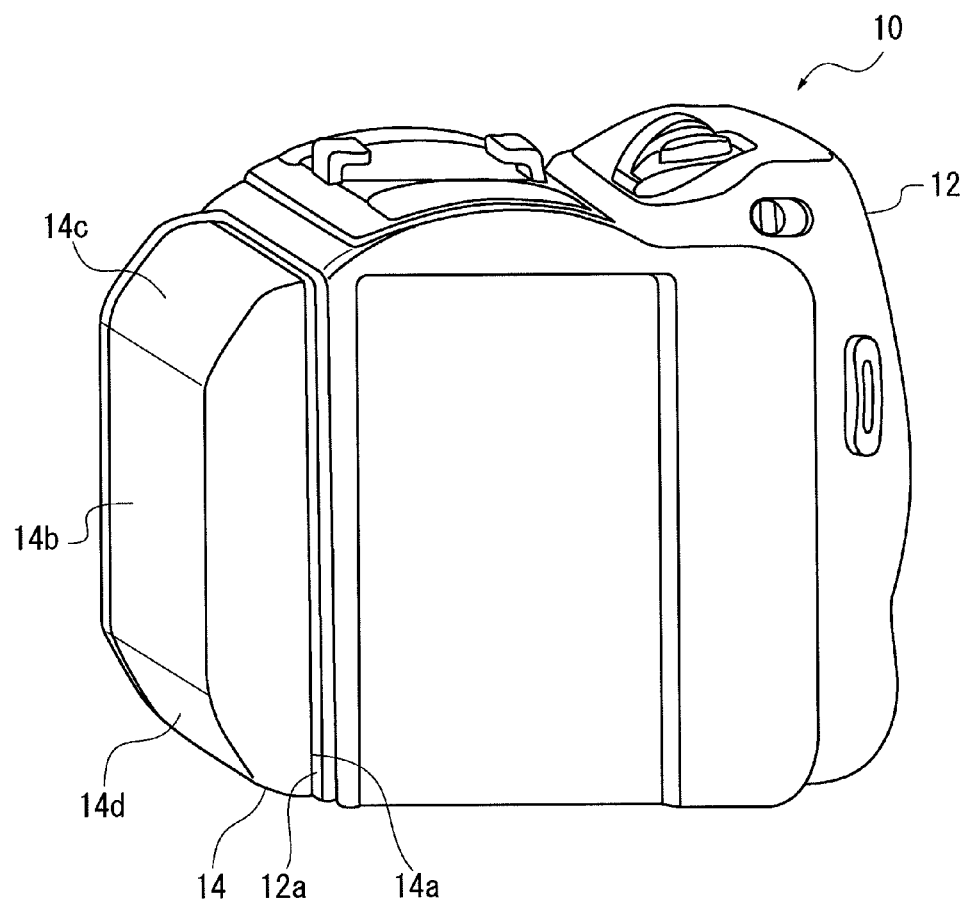
FIG. 2 is a rear view of a video camera according to an embodiment with a liquid crystal panel unit closed.

FIG. 2 is a rear view of the video camera 10 according to the present embodiment with the liquid crystal panel unit 14 closed. The outer surface of the camera body 12 facing the liquid crystal panel unit 14 will hereinafter be referred to as a panel-facing surface 12a. The outer surface of the liquid crystal panel unit 14 facing the panel-facing surface 12a will hereinafter be referred to as a first face 14a. The surface in back of the first face 14a will hereinafter be referred to as a second face 14b. The position of the liquid crystal panel unit 14 in which the first face 14a faces the panel-facing surface 12a as shown in FIG. 2 will be called a first position. The liquid crystal panel unit 14 has an upper incline 14c and a lower incline 14d, which are respectively the chamfered or sloping edges of the second face 14b.

Figure 3:
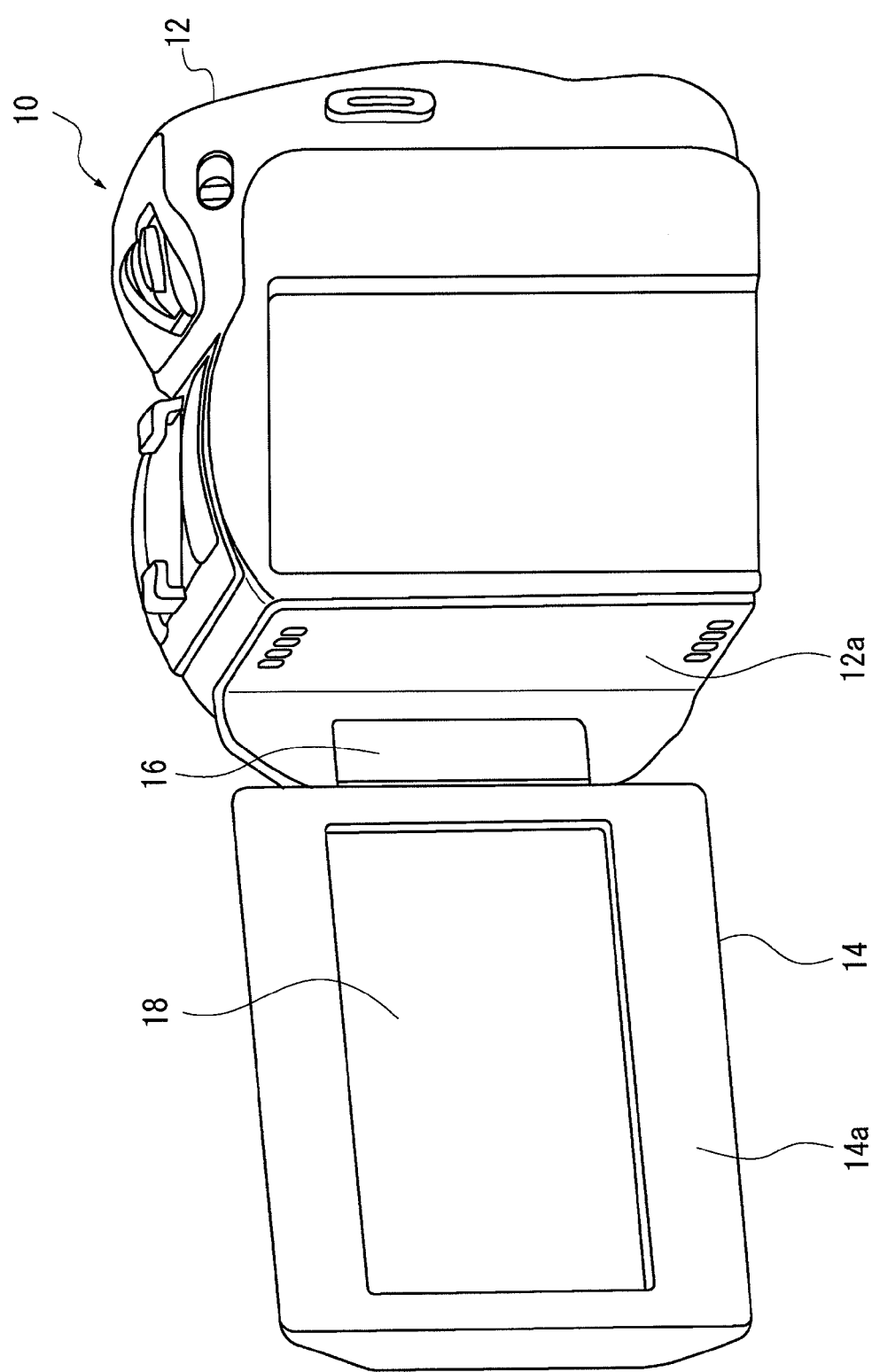
FIG. 3 is a rear view of a video camera according to an embodiment with a liquid crystal panel unit opened.

FIG. 3 is a rear view of the video camera 10 according to the present embodiment with the liquid crystal panel unit 14 opened. A liquid crystal panel 18 is provided in the first face 14a. The liquid crystal panel 18 functions as an image display panel. The liquid crystal panel unit 14 thus functions as an image display panel unit.

Another kind of image display panel, for example an organic light emitting display, can be adopted instead of the liquid crystal panel 18. The turning mechanism 16 turnably supports the liquid crystal panel unit 14 around a horizontal turning shaft (not shown), which is horizontally disposed in parallel with the first face 14a. The user can thus turn the liquid crystal panel 18 the other way by turning the liquid crystal panel unit 14 in its open position around the horizontal turning shaft as shown in FIG. 3. The user can further close the liquid crystal panel unit 14 with its liquid crystal panel 18 turned the other way back to the camera body 12.

Figure 4:
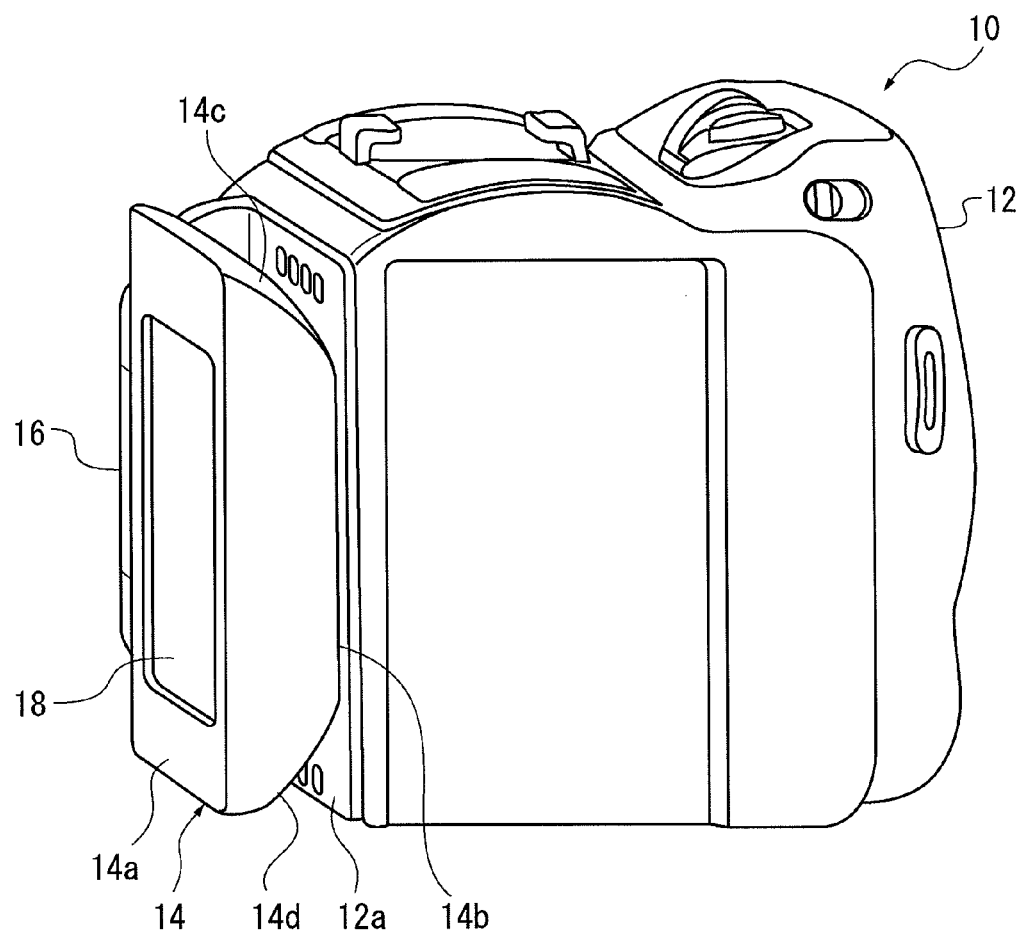
FIG. 4 is a rear view of a video camera according to an embodiment with a liquid crystal panel unit turned the other way and closed.

FIG. 4 is a rear view of the video camera 10 according to the present embodiment with the liquid crystal panel unit 14 turned the other way and closed. The first face 14a of the liquid crystal panel unit 14 faces outward and the second face 14b thereof faces the panel-facing surface 12a. The position of the liquid crystal panel unit 14 in this state will hereinafter be called a second position. As described above, the liquid crystal panel unit 14 is configured as to be movable between the first position and the second position.

Figure 5:
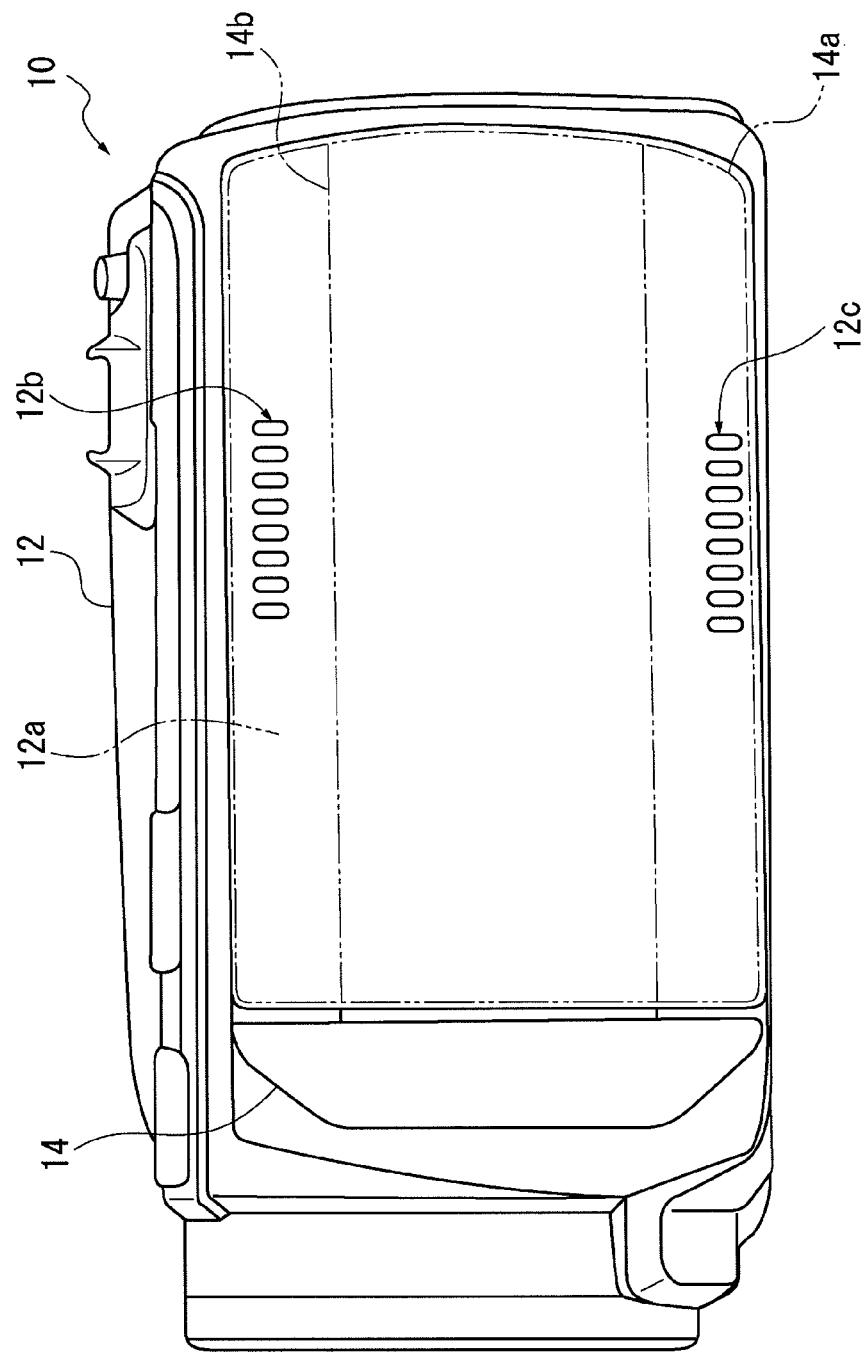
FIG. 5 is a left side view of a video camera according to an embodiment with a liquid crystal panel unit opened.

FIG. 5 is a left side view of the video camera 10 according to the present embodiment with the liquid crystal panel unit 14 opened. Air holes are provided in two positions in the panel-facing surface 12a of the camera body 12. Specifically, air outlet holes 12b, which discharge air from inside to the exterior, and air inlet holes 12c, which take in air from the exterior, are provided in the panel facing surface 12a, the former located at upper center of the panel facing surface 12a and the latter at lower center thereof.

In this embodiment, when the liquid crystal panel unit 14 is in the first position, the entirety of the panel-facing surface 12a including the air outlet holes 12b and the air inlet holes 12c is substantially covered by the first face 14a. When the liquid crystal panel unit 14 is in the second position, the middle part of the panel-facing surface 12a is covered by the second face 14b. The air outlet holes 12b and the air inlet holes 12c in the camera body 12 are, however, open to the exterior without being covered by the first face 14a. As a result, when the liquid crystal panel unit 14 is in the second position, the airflow resistance through the air outlet holes 12b and the air inlet holes 12c is lower than when it is in the first position. The first face 14a and the second face 14b of the liquid crystal panel unit 14 may be so formed as to cover the air outlet holes 12b and the air inlet holes 12c in smaller area when the liquid crystal panel unit 14 is in the second position rather than in the first position.

When the liquid crystal panel unit 14 is in the second position, the upper incline 14c thereof is at such a slant as to be gradually spaced apart from the air outlet holes 12b as it is further away from the second face 14b. The lower incline 14d of the liquid crystal panel unit 14 in this position is at such a slant as to be gradually spaced apart from the air inlet holes 12c as it is further away from the second face 14b. Consequently, the lower incline 14d guides the flow of outside air such that air from further down is taken into the air inlet holes 12c while the upper incline 14c guides the flow of outside air such that air discharged from the air outlet holes 12b moves further up. The upper incline 14c and the lower incline 14d can reduce the air that is discharged from the air outlet holes 12b and goes back into the camera body 12 through the air inlet holes 12c and suppress the rise in the internal temperature of the camera body 12.

The upper incline 14c and the lower incline 14d, when the liquid crystal panel unit 14 is in the first position, provide a chamfered and rounded appearance to the video camera. This can avoid the poor design due to assuming the function of air flow creation.

Figure 6:
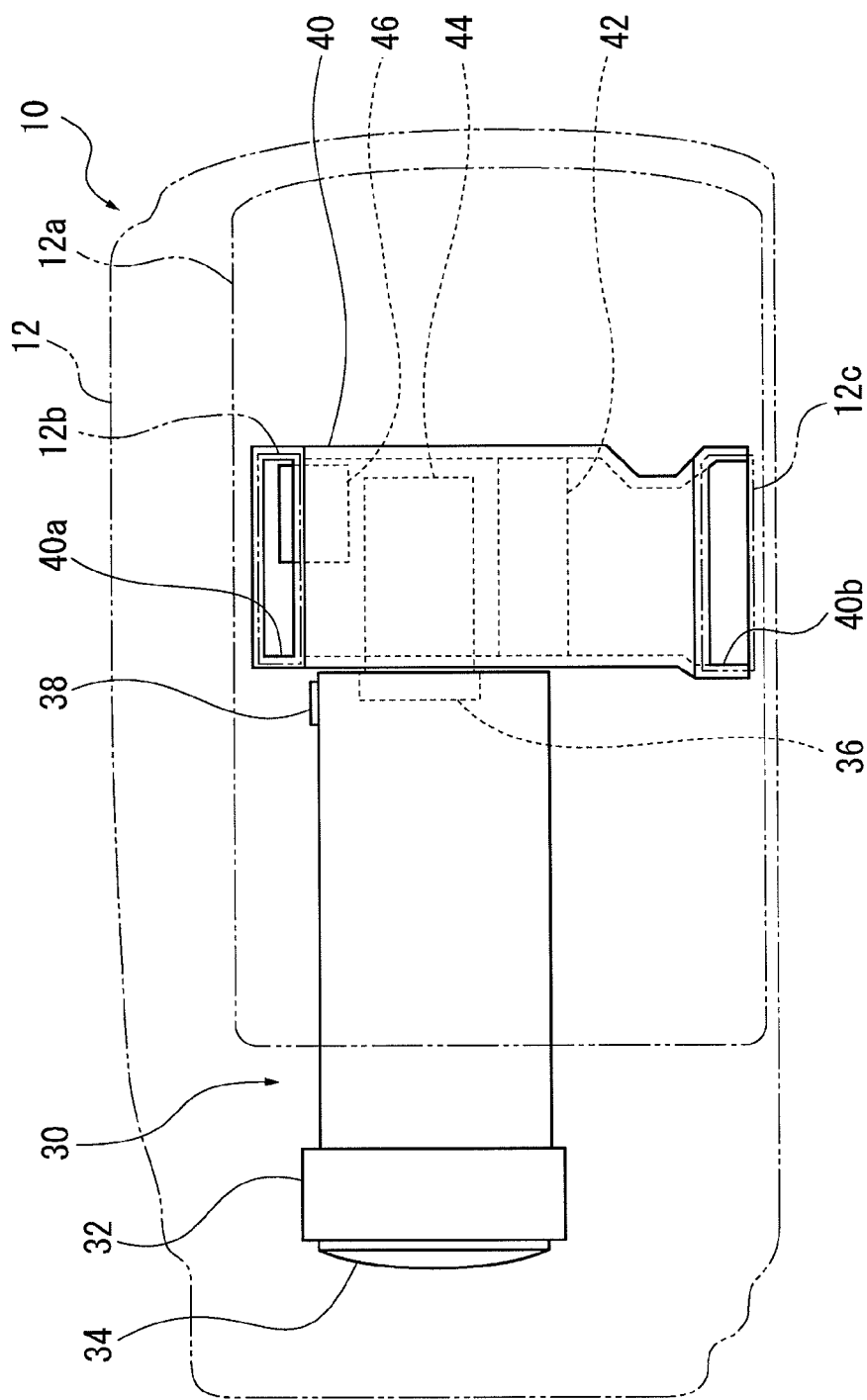
FIG. 6 is a left side view of an internal structure of a video camera.
Figure 7:
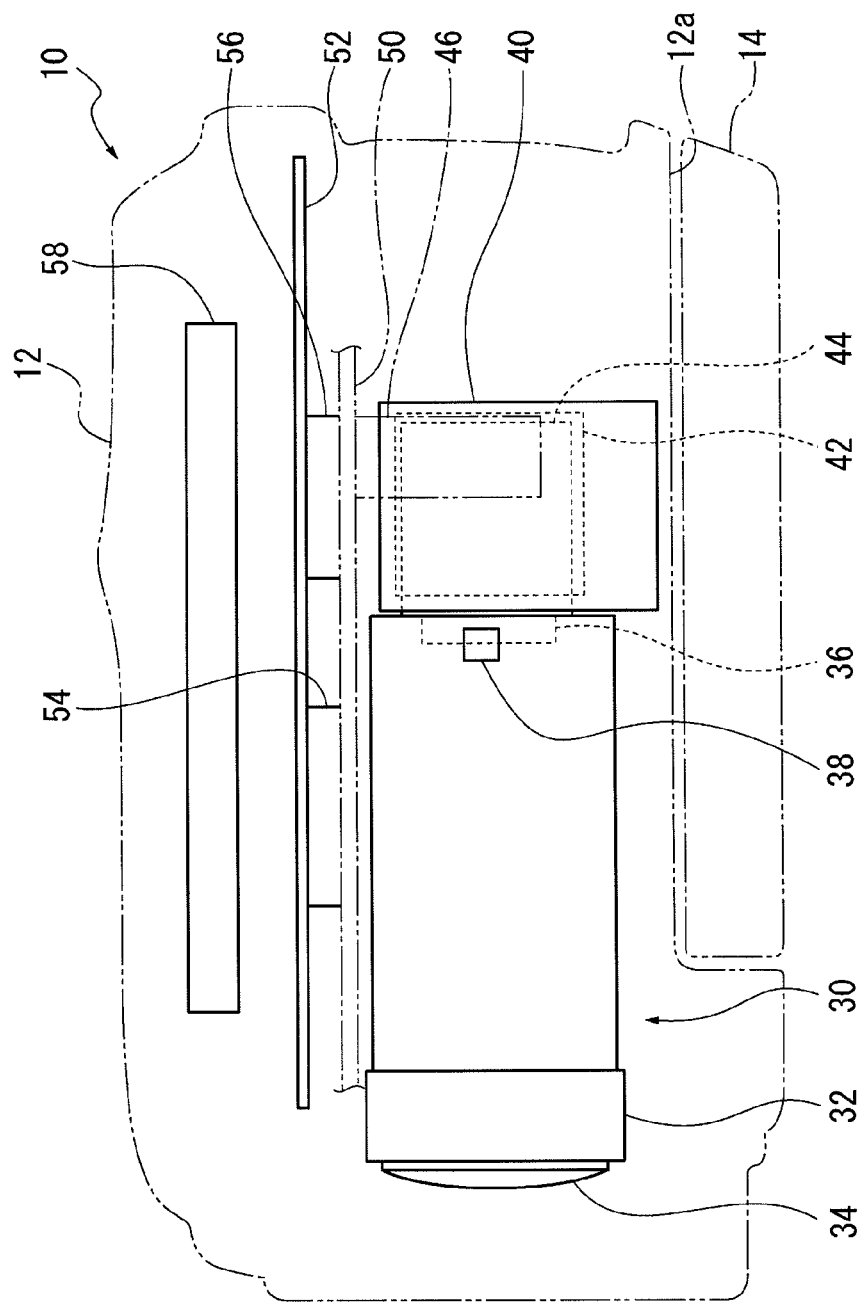
FIG. 7 is a top view of an internal structure of a video camera.

FIG. 6 is a left side view of an internal structure of the video camera 10 according to the present embodiment and FIG. 7 is a top view thereof. The internal structure of the video camera 10 will be explained with reference to both FIG. 6 and FIG. 7.

Provided within the camera body 12 are an image pickup unit 30, a thermistor 38, a substrate 52, and a hard disk drive 58. The image pickup unit 30 includes a unit body 32, a group of lenses including a lens 34, and an image sensor 36. The unit body 32, which is formed cylindrically, is placed within the camera body 12 so that its axis is oriented in the longitudinal direction. The lens 34 is attached to the front end of the unit body 32 and the others of the group of lenses are located within the unit body 32. The image sensor 36 is attached to the rear end of the unit body 32.

The image sensor 36 convert an optical image inputted through the group of lenses including the lens 34 from the front of the video camera 10 into electrical signals and outputs them as video signals. The image sensors 36 employed in this embodiment are a CMOS image sensor. Note that a CCD image sensor may be employed in place of the CMOS image sensor or some other type of image sensor may also be used. The thermistor 38, which is located on the unit body 32 and near the image sensor 36, detects the ambient temperature of the image sensor 36. The substrate 52 is located on the right side of the image pickup unit 30, and the hard disk drive 58 is located further on the right side of the substrate 52. The video signals outputted from the image sensor 36 are inputted to the substrate 52.

Figure 8:
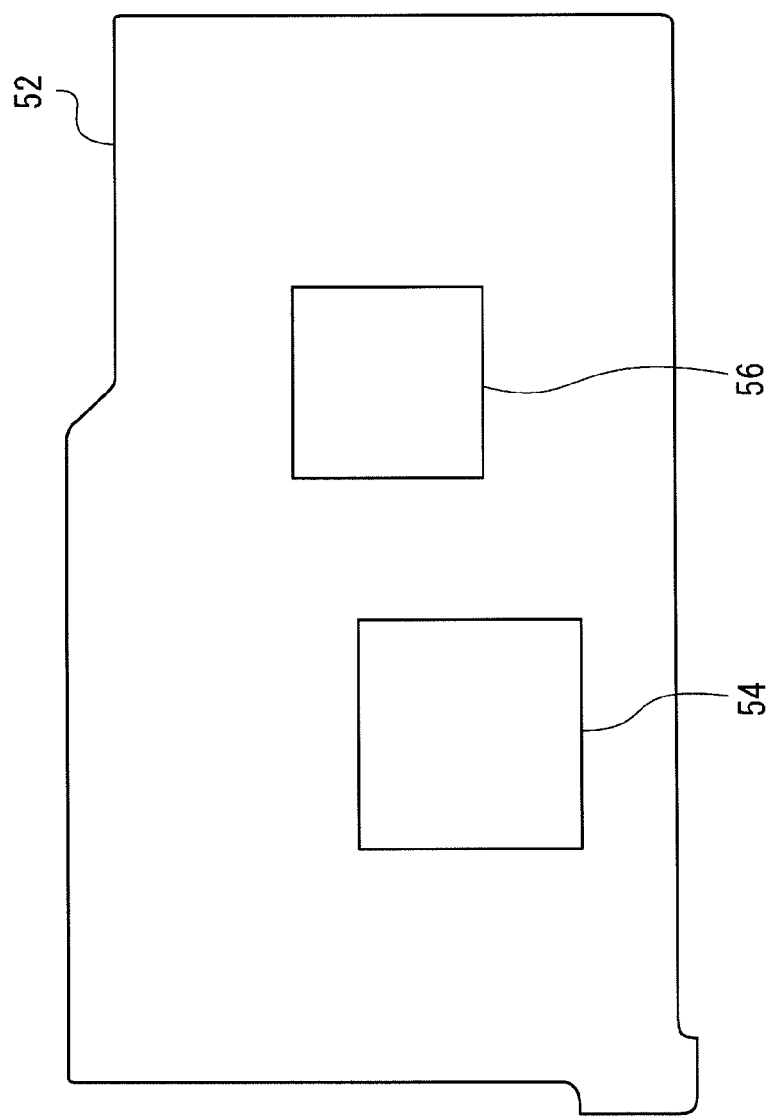
FIG. 8 illustrates an appearance of a substrate.

FIG. 8 illustrates an appearance of a substrate 52 according to the present embodiment. Mounted on the substrate 52 are a first processing unit 54 and a second processing unit 56, which are both semiconductor devices. The first processing unit 54 and the second processing unit 56 perform various processing operations including coding on the video signals inputted from the image sensor 36. With a command given for video recording of image data generated by these processing operations, the image data are stored in the hard disk drive 58. The first processing unit 54 and the second processing unit 56 generate video signals for display on the liquid crystal panel 18 or the like by performing processing operations such as decoding on the image data stored in the hard disk drive 58 or the image data generated from the video signals from the image sensor 36.

Referring back to FIG. 6 and FIG. 7, principal heat sources inside the camera body 12 are the first processing unit 54, the second processing unit 56, the hard disk drive 58, and the image sensor 36. Of these, the first processing unit 54 and the second processing unit 56 produce larger amounts of heat than the others during standby for video recording and video recording.

The image sensor, such as a CMOS image sensor or CCD image sensor, may produce ill effects on the image data generated if they are allowed to get too hot. When image data generated under the influence of high temperature is used in displaying images on the liquid crystal panel or the like, the display is sometimes prone to "white scars" or other defects.

White scars occur about ten times more often when images are displayed using video signals outputted from a CMOS image sensor than from a CCD image sensor in a given high-temperature environment.

To counter the heating, a duct 40, a motor-driven fan 42, a first heat sink 44, a second heat sink 46, and a separation member 50 are provided inside the camera body 12. The separation member 50, which is a plate of aluminum or other material with high thermal conductivity, constitutes a part of the casing of the camera body 12. The separation member 50 is disposed in such a position as to separate from each other a region where the substrate 52 is located and a region where the image sensor 36 are located so that air around the first processing unit 54 and the second processing unit 56 and air around the hard disk drive 58 may not enter directly into the area around the image sensor 36.

The duct 40 has a first opening 40a and a second opening 40b. The duct 40 is disposed in the back of the panel-facing surface 12a such that the first opening 40a and second opening 40b thereof are located on the back of the air outlet holes 12b and the air inlet holes 12c, respectively. The duct 40, which is formed in a linear manner as shown in FIG. 6, guides the air inside the video camera in a linear flow from bottom up. In this manner, the duct 40 conducts the air taken in through the air inlet holes 12c to the air outlet holes 12b.

The first heat sink 44, which functions as a radiator, is mounted on the back of the image sensor 36 to conduct heat therefrom. The first heat sink 44 is so arranged as to extend from the image sensor 36 into the duct 40, thereby releasing the heat generated by the image sensor 36 into the duct 40.

The separation member 50 is disposed in contact with the exterior of the first processing unit 54 and the second processing unit 56 with a heat conducting sheet held between itself and the exterior thereof such that the separation member 50 can conduct the heat from the first processing unit 54 and the second processing unit 56. The second heat sink 46, which also functions as a heat sink, is mounted on a side of the separation member 50 to conduct the heat there from. The second heat sink 46 is arranged as to extend from the separation member 50 into the duct 40, thereby releasing the heat generated by the first processing unit 54 and the second processing unit 56 into the duct 40 through the medium of the separation member 50.

Figure 9:
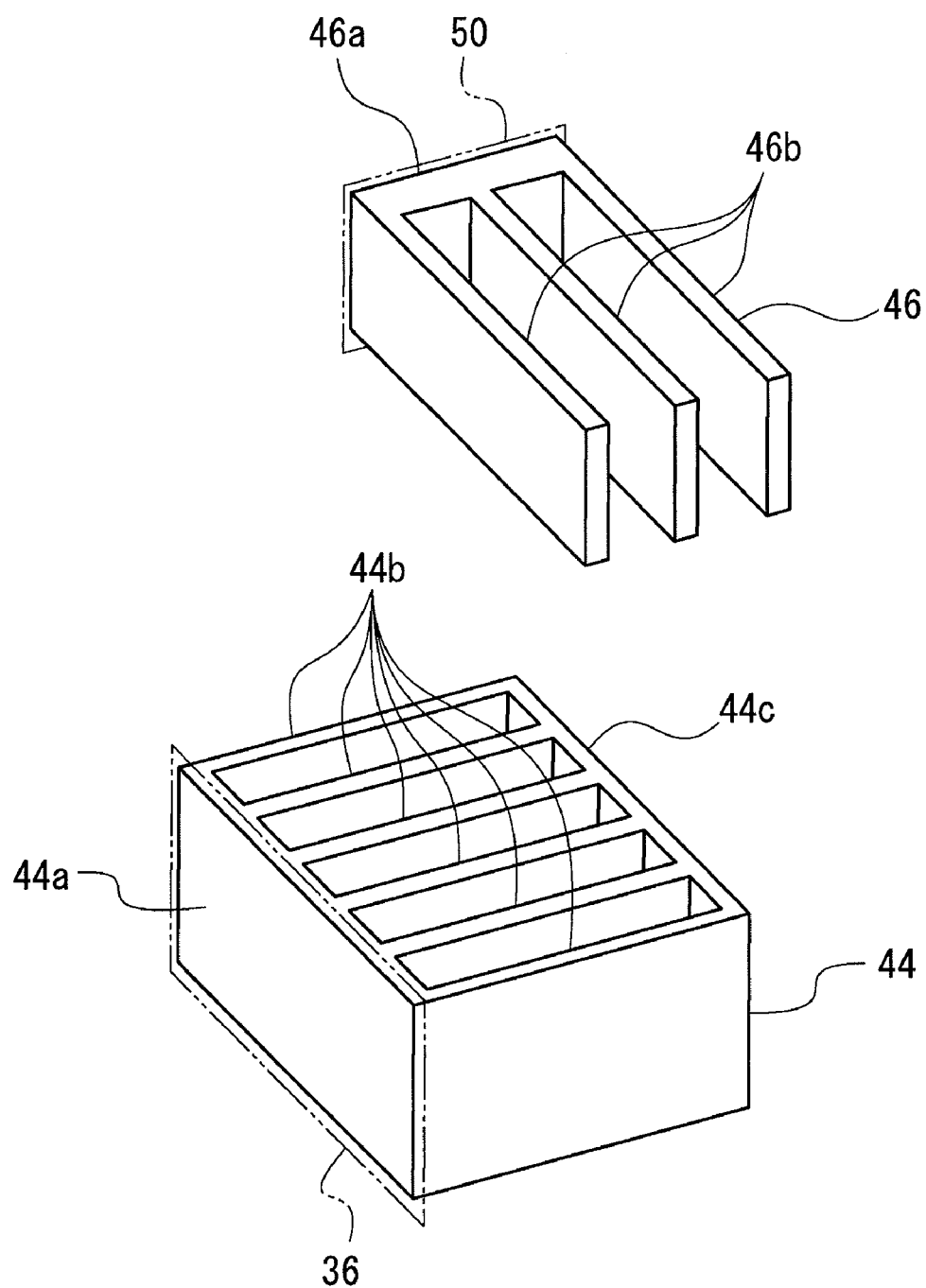
FIG. 9 illustrates a first heat sink and a second heat sink.

FIG. 9 illustrates a first heat sink 44 and a second heat sink 46 according to the present embodiment. For ease of understanding, the illustration in FIG. 9 places the first heat sink 44 and the second heat sink 46 wider apart from each other in the vertical direction than in their actual positions within the duct 40.

As shown in FIG. 9, the first heat sink 44 is disposed such that a plurality of fins 44b perpendicularly extend from a mounting face 44a, which is attached to the image sensor 36. In this embodiment, a plate-like connecting member 44c, which is positioned in parallel with the mounting face 44a, interconnects the ends of the extending fins 44b. This interconnection of the ends of the fins 44b prevents the electromagnetic noise generated by the image sensor 36 from being amplified by the fins 44b. The first heat sink 44 is formed by extrusion-molding an aluminum material. Hence, the first heat sink 44 displays better heat release performance than the one formed by die-casting the aluminum material.

The second heat sink 46 is located downstream of the first heat sink 44 in the air flow. The second heat sink 46 conducts the heat generated by the first processing unit 54 and second processing unit 56, which can get the hottest among the components of the video camera, through the separation member 50. The location of the second heat sink 46 downstream of the first heat sink 44 in the air flow, therefore, keeps the heat generated at the first processing unit 54 and second processing unit 56 from being conducted to the first heat sink 44.

The second heat sink 46 has a plurality of fins 46b perpendicularly extending from a mounting face 46a, which is attached to the separation member 50. The second heat sink 46 is also formed by extrusion-molding an aluminum material. The first heat sink 44 is attached to the image sensor 36 at the mounting face 44a, which is the front face thereof. The second heat sink 46 is attached to the separation member 50 at the mounting face 46a, which is the right side thereof. Accordingly, the fins 44b of the first heat sink 44 and the fins 46b of the second heat sink 46 extend at right angles to each other.

Referring back to FIG. 6 and FIG. 7, the duct 40 is disposed in an area separated from the area of the first processing unit 54 and second processing unit 56 by the separation member 50. The duct 40 has no opening for air intake except for the first opening 40a, the second opening 40b, a hole through which the first heat sink 44 is inserted, and a hole through which the second heat sink 46 is inserted. The air around the processing units is thus prevented from entering into the duct.

The motor-driven fan 42, when it is running, forces the air taken in through the air inlet holes 12c out of the air outlet holes 12b. The motor-driven fan 42 is located below the first heat sink 44 at an upstream point of the air flow. The motor-driven fan 42 may be located downstream of the first heat sink 44 or the second heat sink 46 in the air flow. Since the motor-driven fan 42 also produces some heat, locating the motor-driven fan 42 downstream of the first heat sink 44 or the second heat sink 46 contributes to more effective cooling by the first heat sink 44 and the second heat sink 46.

The motor-driven fan 42 is covered with a coat of gel around the periphery and is mounted to the inside of the duct 40 through this gel. This gel, in cooperation with the gel covering the microphone 15, suppresses the transfer of the noise and vibration produced by the motor-driven fan 42 to the microphone 15. Since the motor-driven fan 42 is housed within the duct, the propagation of its noise through air is effectively suppressed thus realizing a low-noise feature of this camera. The duct 40 therefore greatly reduces the noise reaching the microphone 15.

Figure 10:
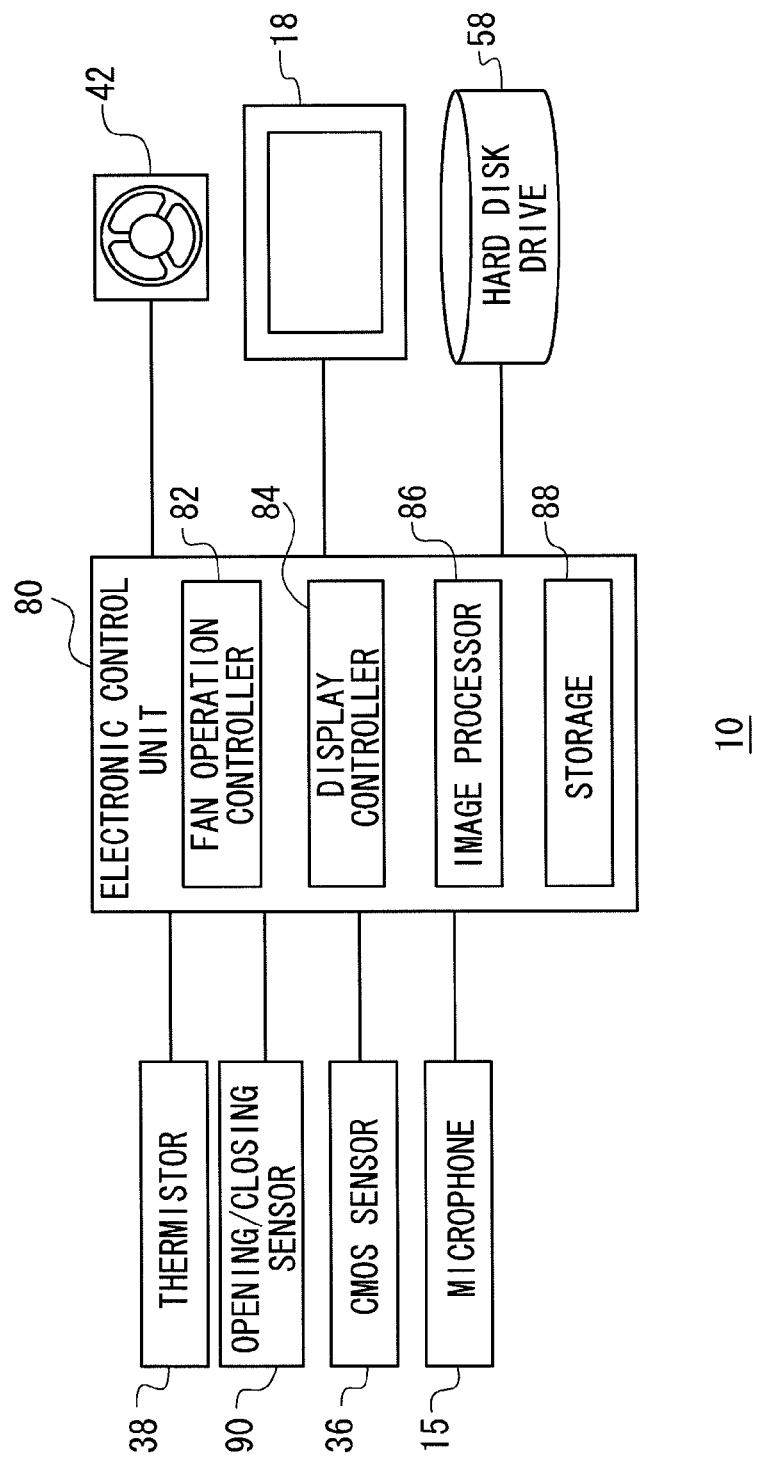
FIG. 10 is a functional block diagram of a video camera.

FIG. 10 is a functional block diagram of a video camera 10 according to the present embodiment. FIG. 10 depicts functional blocks that can be realized by hardware such as a central processing unit (CPU) for executing various arithmetic processing operations, a read only memory (ROM) for storing various control programs, and a random access memory (RAM) for data storage and also as a work area for executing programs in cooperation with software. The functional blocks may be implemented by a variety of manners including only hardware, only software, or a combination of both.

The video camera 10 includes an electronic control unit 80. The electronic control unit 80 has a storage 88, which is equipped with a ROM, flash memory, or the like, and is configured to carry out control based on the program stored beforehand in the storage 88. The electronic control unit 80 is connected to the motor-driven fan 42, the liquid crystal panel 18, and the hard disk drive 58.

The video camera 10 includes an opening/closing sensor 90. The opening/closing sensor 90 detects the opening or closing of the liquid crystal panel unit 14 by determining whether the liquid crystal panel unit 14 has turned to a predetermined position around the turning shaft of the turning mechanism 16. Opening/closing sensors of this nature are generally known in the art. The opening/closing sensor 90, which is connected to the electronic control unit 80, outputs the results of detection to the electronic control unit 80.

Thermistor 38 is connected to the electronic control unit 80, and the results of detection by the thermistor 38 are output to the electronic control unit 80. The image sensor 36 and the microphone 15 are also connected to the electronic control unit 80. Video signals taken and generated by the image sensor 36 and audio signals detected by the microphone 15 are both output to the electronic control unit 80.

The electronic control unit 80 further includes a fan operation controller 82, a display controller 84, and an image processor 86. The fan operation controller 82 controls the operation of the motor-driven fan 42 by controlling the on and off of power supply to the motor-driven fan 42. The display controller 84 has the liquid crystal panel 18 display images by outputting video signals based on image data thereto. The image processor 86 performs various signal processing operations including coding on video signals sent from the image sensor 36. When a video recording standby mode is switched to a video recording mode with the user pressing a video recording switch (not shown), the electronic control unit 80 has the hard disk drive 58 store the image data generated through signal processing by the image processor 86.

In place of the hard disk drive 58, the video camera 10 may be provided with a flash memory or an attachment device capable of detachably holding a recording medium such as a memory card. In such a case, when the video recording standby mode is switched to the video recording mode, the electronic control unit 80 has the generated image data stored by the flash memory or the memory card.

When the opening/closing sensor 90 has detected the opening of the liquid crystal panel unit 14 from the first position, the electronic control unit 80 determines by referring to a power flag whether the power to the video camera 10 has turned on or not. If the power to the video camera 10 is not on, the electronic control unit 80 turns it on, thereby setting the power flag to on.

With the video camera 10 in this embodiment, one of the video recording standby mode, the video recording mode, and the playback mode is being selected when the power thereto is on. When the opening/closing sensor 90 has detected the state of the first face 14a of the liquid crystal panel unit 14 having moved to a predetermined position away from the panel-facing surface 12a of the camera body 12 from the above-mentioned "power off" state, the electronic control unit 80 turns on the video recording standby mode on the assumption that the liquid crystal panel unit 14 has been opened from the first position. At this time, the electronic control unit 80 sets a mode flag to the value indicating the video recording standby mode. In the video recording standby mode, the electronic control unit 80 has the image sensor 36 driven to output signals, performs an image processing, or the like on the image data generated from the signals, and has the liquid crystal panel 18 display the images.

As a video recording start button is pressed by the user, the electronic control unit 80 starts the video recording mode by setting the mode flag to the value indicating the video recording mode. In the video recording mode, the electronic control unit 80 performs video recording by storing the image data generated through image processing in the hard disk drive 58. With a stop button (not shown) pressed by the user, the electronic control unit 80 switches the video recording mode to the video recording standby mode.

If the liquid crystal panel unit 14 is closed to the first position by the user in the video recording standby mode or in the video recording mode, then the electronic control unit 80 will turn off power to the video camera 10, thereby setting the power flag to off. At this time, the fan operation controller 82 stops the operation of the motor-driven fan 42 also, thus preventing the fan from operating when the liquid crystal panel unit 14 is in the first position. When this happens in the video recording mode, video recording is stopped and storage of image data in the hard disk drive 58 is also stopped.

Note that the fan operation controller 82 may control the operation of the motor-driven fan 42 according to the result of detection by the thermistor 38 instead of the opening/closing timing of the liquid crystal panel unit 14. For example, the fan operation controller 82 may start the operation of the motor-driven fan 42 when a temperature at or above a predetermined high-temperature threshold value is detected by the thermistor 39 and may stop its operation when a temperature at or below a predetermined low-temperature threshold value is detected thereby.

When a playback mode button (not shown) provided on the camera body 12 is pressed by the user in the video recording standby mode, the electronic control unit 80 switches the mode to the playback mode by setting the mode flag to the value indicating the playback mode. With the playback mode turned on, the display controller 84 has the liquid crystal panel 18 display thumb-nail images of image data of moving or still images stored in the hard disk drive 58. If certain image data is selected with a selection button (not shown) provided on the camera body 12 pressed by the user, the display controller 84 has the liquid crystal panel 18 display images corresponding to the selected image data.

Note also that the video camera 10 is so configured that it can be connected to an external DVD (Digital Versatile Disc) burner, which is a DVD writing device, and video-recorded image data stored in the hard disk drive 58 can be recorded on the DVD medium. In this case, too, if certain image data is selected by the user as images to be recorded on the DVD medium in the playback mode, the electronic control unit 80 will output the selected image data to the external DVD burner connected to the video camera 10. The video camera 10 may also be connectable to any writing device capable of recording image data not only on DVD but also on other recording media. In this case, if certain image data is selected by the user in the playback mode, the electronic control unit 80 may output the selected image data to the writing device to record it on a recording medium.

Figure 11:
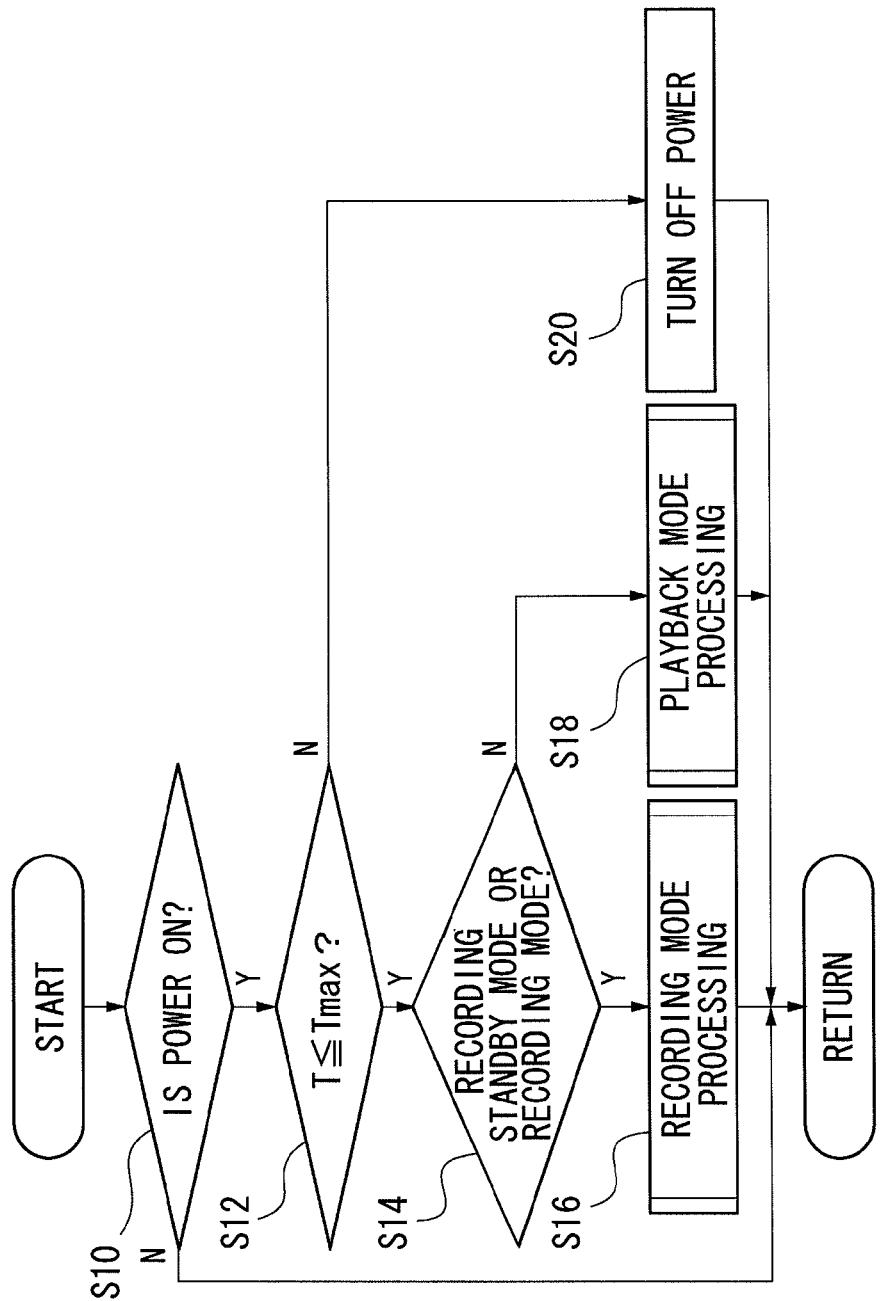
FIG. 11 is a flowchart showing operation control for a fan of a video camera.

FIG. 11 is a flowchart showing operation control for the motor-driven fan 42 of the video camera 10 according to the present embodiment. The processing operations in this flowchart are repeated every predetermined period of time.

The fan operation controller 82, by referring to the power flag, determines whether the power to the video camera 10 is on or not (S10). If the power to the video camera 10 is off (N of S10), the processing operations in this flowchart are temporarily terminated.

If the power to the video camera 10 is on (Y of S10), the fan operation controller 82 determines whether an internal temperature T of the camera body 12 as detected by the thermistor 38 is at or below a high-temperature threshold value Tmax or not (S12). Data representing the high-temperature threshold value Tmax, which is set at 70° C. in this embodiment, is stored beforehand in the storage 88. When the internal temperature T is determined to be higher than the high-temperature threshold value Tmax (N of S12), the fan operation controller 82 turns off power to the video camera 10 and at the same time sets the power flag to off (S20).

When the internal temperature T is determined to be at or below the high-temperature threshold value Tmax (Y of S12), the fan operation controller 82, by referring to the mode flag, determines whether the video recording standby mode or the video recording mode for driving the image sensor 36 is now on or not (S14). If the video recording standby mode or the video recording mode is determined to be on (Y of S14), the fan operation controller 82 executes the processing for the video recording mode (S16). If neither the video recording standby mode nor the video recording mode is determined to be on, that is, if the playback mode is determined to be on (N of S14), the fan operation controller 82 executes the processing for the playback mode (S18).

Figure 12:
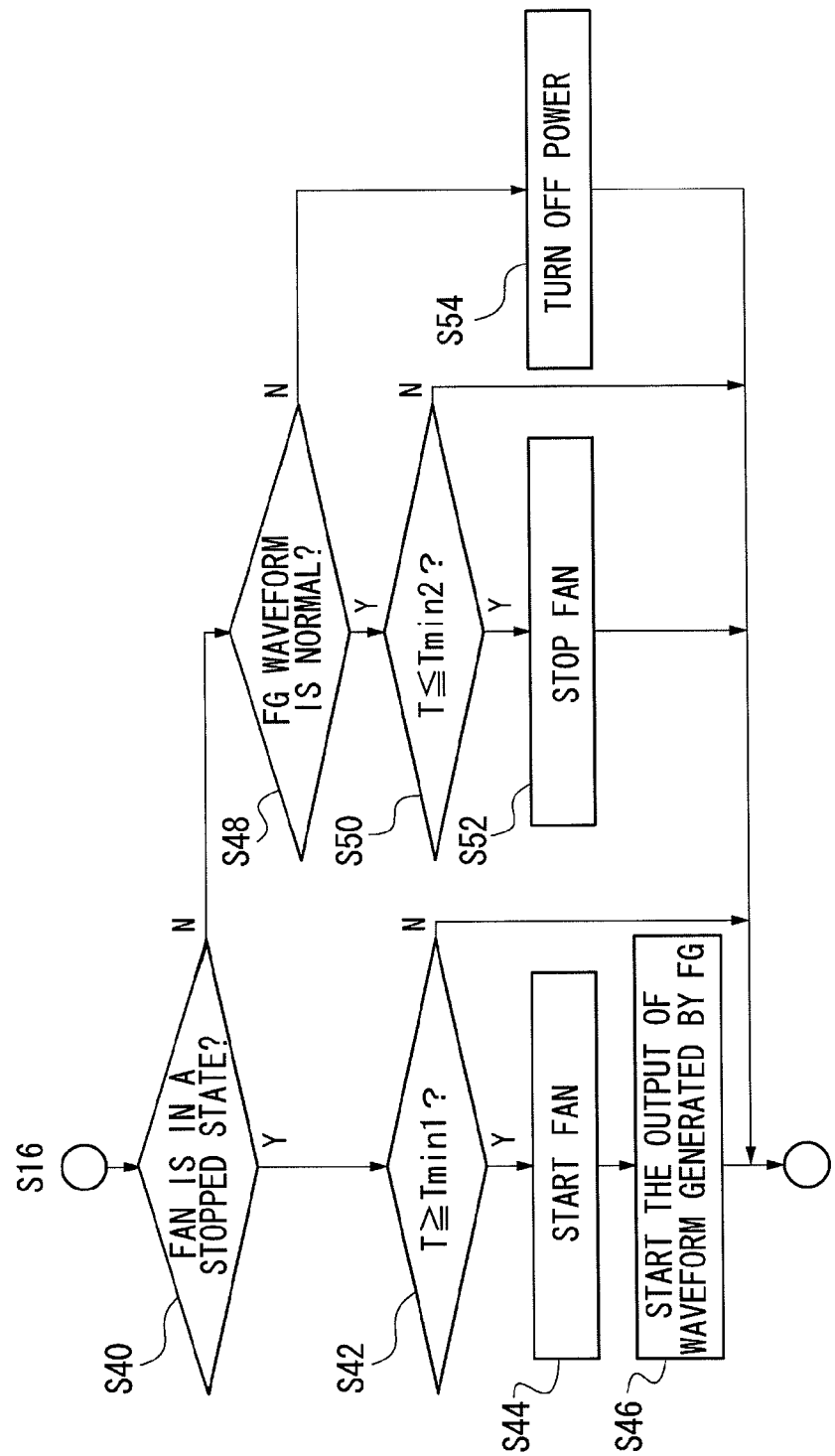
FIG. 12 is a flowchart showing an execution procedure of video recording mode processing in S16 of FIG. 11.

FIG. 12 is a flowchart showing an execution procedure of video recording mode processing operations in S16 of FIG. 11. The fan operation controller 82 determines by referring to the fan operation flag whether the motor-driven fan 42 is in a stopped state or not (S40). If the motor-driven fan 42 is in a stopped state (Y of S40), the fan operation controller 82 determines whether the internal temperature T is at or above a first low-temperature threshold value Tmin1 or not (S42). Data representing the first low-temperature threshold value Tmin1, which is set at 10° C. in this embodiment, is stored beforehand in the storage 88. If the internal temperature T is determined to be below the first low-temperature threshold value Tmin1 (N of S42), S44 and S46 are skipped because of the low temperature and the stopped state of the motor-driven fan 42 is maintained.

If the internal temperature T is determined to be at or above the first low-temperature threshold value Tmin1 (Y of S42), the fan operation controller 82 starts the operation of the motor-driven fan 42 (S44). Note that the motor-driven fan 42 is equipped with a Frequency Generator (FG) pulse generator (not shown). As the motor-driven fan 42 starts operating, the FG pulse generator outputs predetermined waveforms. The waveform generated by the FG pulse generator (hereinafter referred to as "FG waveform") is outputted to the electronic control unit 80 (S46).

When the motor-driven fan 42 is already running (N of S40), the fan operation controller 82 determines by referring to a reference FG waveform whether the inputted FG waveform is normal or not (S48). Note that the reference FG waveform has predetermined standards for the cycle, duty, and other parameters of the FG waveform, and the data representing the reference FG waveform are stored beforehand in the storage 88. If the FG waveform is determined to be abnormal (N of S48), the fan operation controller 82 turns off power to the video camera 10 (S54) and at the same time sets the power flag to off.

If the FG waveform is determined to be normal (Y of S48), the fan operation controller 82 determines whether the internal temperature T is at or below a second low-temperature threshold value Tmin3 or not (S50). Data representing the second low-temperature threshold value Tmin2, which is set at 5° C. in this embodiment, is stored beforehand in the storage 88. If the internal temperature T is determined to be above the second low-temperature threshold value Tmin2 (N of S50), S52 is skipped and the running state of the motor-driven fan 42 is maintained. If the internal temperature T is determined to be at or below the second low-temperature threshold value Tmin2 (Y of S50), the fan operation controller 82 stops the operation of the motor-driven fan 42 because of the low temperature (S52).

Figure 13:
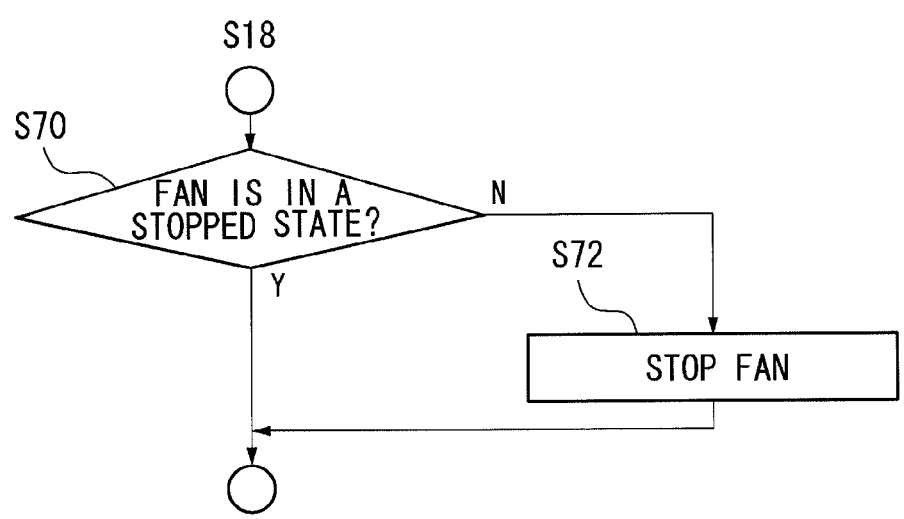
FIG. 13 is a flowchart showing an execution procedure of playback mode processing in S18 of FIG. 11.

FIG. 13 is a flowchart showing an execution procedure of playback mode processing operations in S18 of FIG. 11. The fan operation controller 82 determines by referring to the fan operation flag whether the motor-driven fan 42 is in a stopped state or not (S70). If the motor-driven fan 42 is in a stopped state (Y of S70), the fan operation controller 82 terminates the processing operations in this flowchart. If the motor-driven fan 42 is running (N of S70), the fan operation controller 82 stops the operation of the motor-driven fan 42 (S72).

In the playback mode, there is no generation of image data based on video signals from the image sensor 36. Few defects such as white defects caused by the image sensor 36 can occur and the necessity to cool the image sensor 36 is not so great as in the video recording standby mode or the video recording mode. Thus, stopping the operation of the motor-driven fan 42 in the playback mode contributes to the power saving and the noise reduction.

In the present embodiment, the fan operation controller 82 drives the motor-driven fan 42 with the timing of image sensor operation when image data based on video signals from the image sensor 36 are to be generated, and the fan operation controller 82 stops the motor-driven fan 42 when the image sensor 36 is not outputting video signals. The image sensor 36 is cooled in a focused manner by the duct 40 and the first heat sink 44 instead of employing the air circulation through the entire inside of the camera body 12. On the other hand, when the image sensor 36 is not operating, there is not much necessity to cool it and the amount of heat produced by the first processing unit 54 and the second processing unit 56 is smaller than when the image sensor 36 is outputting video signals. Thus, when the necessity to cool the image sensor 36 is high, the interior of the camera body 12 can be effectively cooled by operating the motor-driven fan 42 when the image sensor 36 operates and outputs video signals.

The present invention is not limited to the above-described embodiments; any combination of the above-described structural components as appropriate is effective as and encompassed by the present embodiments. It is understood by those skilled in the art that various modifications such as changes in design may be made based on their knowledge and the embodiments added with such modifications are also within the scope of the present invention.

What is claimed is:

1. A video camera, comprising:
    a camera body having air outlet holes and air inlet holes, either the air outlet holes or the air inlet holes being disposed in a panel-facing surface of the camera body;
    a duct, disposed inside the camera body, configured to guide air taken in through the air inlet holes to the air outlet holes;
    an image sensor disposed inside the camera body;
    a heat sink configured to release heat generated by the image sensor into the duct; and
    an image display panel unit having an image display panel, the image display panel unit being movably disposed between a first position in which a first face including a display screen faces the panel-facing surface of the camera body and a second position in which a second face in back of the first face faces the panel-facing surface of the camera body, and wherein the image display panel unit is configured such that airflow resistance through the air outlet holes or the air inlet holes in the panel-facing surface is lower when the image display panel is in the second position than when the image display panel is in the first position.

2. The video camera of claim 1, wherein the first face and the second face cover either the air outlet holes or air inlet holes with a smaller area when the image display panel unit is in the second position than when the image display panel unit is in the first position.

3. The video camera of claim 1, wherein the image display panel unit has an incline, the incline faces the panel-facing surface when the image display panel unit is in the second position and gradually inclines spaced apart from either of the air outlet holes or the air inlet holes when the image display panel unit is in the second position.

4. The video camera of claim 1, further comprising a processing unit configured to perform signal processing on a video signal outputted from the image sensor and wherein air around the processing unit does not enter into the duct.

5. The video camera of claim 4, further comprising a separation member that separates a region corresponding to the processing unit so that air around the processing unit does not enter around the image sensor from a region corresponding to the image sensor.

6. The video camera of claim 1, further comprising:
a fan configured to force air taken in through the air inlet holes out of the air outlet holes; and
a fan operation controller configured to controls an operation of the fan, wherein the fan operation controller stops the operation of the fan when the image display panel unit is in the first position.

7. The video camera of claim 1, further comprising:
a fan configured to force the air taken in through the air inlet holes out of the air outlet holes; and
a fan operation controller configured to control an operation of the fan, wherein the fan operation controller operates the fan with a predetermined timing corresponding to operation of the image sensor when image data based on video signal output from the image sensor is generated.

8. The video camera of claim 7, further comprising a display controller configured to display an image corresponding to generated image data and based on a video signal on the image display panel when the image sensor is operated to output the video signal, and wherein the display controller starts the operation of the image sensor and displays the image corresponding to the generated image data on the image display panel when the first face of the image display panel unit is moved to a predetermined position away from the panel-facing surface of the camera body, and wherein the fan operation controller operates the fan when the first face of the image display panel unit is moved to a predetermined position away from the panel-facing surface of the camera body.

9. The video camera of claim 2, wherein the image display panel unit includes an incline, the incline faces the panel-facing surface when the image display panel unit is in the second position and gradually inclines spaced apart from either the air outlet holes or the air inlet holes when the image display panel unit is in the second position.

10. The video camera of claim 2, further comprising a processing unit configured to perform signal processing on a video signal outputted from the image sensor, wherein the duct is provided so that air around the processing unit does not enter into the duct.

11. The video camera of claim 10, further comprising a separation member configured to separate a region corresponding to the processing unit so that air around the processing unit does not enter around the image sensor from a region corresponding to the image sensor.

12. The video camera of claim 2, further comprising:
a fan configured to force the air taken in through the air inlet holes out of the air outlet holes; and
a fan operation controller configured to control an operation of the fan, wherein the fan operation controller stops the operation of the fan when the image display panel unit is in the first position.

13. The video camera of claim 2, further comprising:
a fan configured to force air taken in through the air inlet holes out of the air outlet holes; and
a fan operation controller configured to control an operation of the fan, wherein the fan operation controller operates the fan with predetermined timing of operation of the image sensor when image data based on a video signal output from the image sensor is generated.

14. The video camera of claim 13, further comprising a display controller configured to display an image corresponding to generated image data based on a video signal on the image display panel when the image sensor is operated to output the video signal, wherein the display controller starts the operation of the image sensor and displays the image corresponding to the generated image data on the image display panel when the first face of the image display panel unit is moved to a predetermined position away from the panel-facing surface of the camera body, and wherein the fan operation controller operates the fan when the first face of the image display panel unit is moved to a predetermined position away from the panel-facing surface of the camera body.

* * * * *